United States Patent
Takeda et al.

(10) Patent No.: US 8,986,510 B2
(45) Date of Patent: Mar. 24, 2015

(54) METHOD OF DECOMPOSING TARGET AND DECOMPOSITION APPARATUS

(75) Inventors: Yoshihiro Takeda, Urayasu (JP); Fumitaka Mafune, Tokyo (JP); Tamotsu Kondou, Tokyo (JP)

(73) Assignee: Genesis Research Institute, Inc., Nagoya-shi, Aichi-ken (JP)

( * ) Notice: Subject to any disclaimer, the term of this patent is extended or adjusted under 35 U.S.C. 154(b) by 1587 days.

(21) Appl. No.: 11/920,125

(22) PCT Filed: May 9, 2006

(86) PCT No.: PCT/JP2006/309623
§ 371 (c)(1),
(2), (4) Date: Feb. 13, 2009

(87) PCT Pub. No.: WO2006/121179
PCT Pub. Date: Nov. 16, 2006

(65) Prior Publication Data
US 2009/0229968 A1    Sep. 17, 2009

(30) Foreign Application Priority Data

May 9, 2005    (JP) .................................. 2005-136262

(51) Int. Cl.
    *B01J 19/12*    (2006.01)
    *A62D 3/10*    (2007.01)
    *B01J 37/34*    (2006.01)

(52) U.S. Cl.
    CPC ................ *A62D 3/10* (2013.01); *B01J 19/121* (2013.01); *B01J 37/349* (2013.01); *A62D 2203/10* (2013.01); *Y10S 977/779* (2013.01)
    USPC ...................... 204/157.15; 422/186; 977/779

(58) Field of Classification Search
    CPC ..... A62D 3/10; A62D 2203/10; B01J 19/121; B01J 37/349
    USPC ............. 422/186.04, 186; 977/835, 895, 903, 977/911, 810; 204/157.15; 702/28; 424/9.34
    See application file for complete search history.

(56) References Cited

U.S. PATENT DOCUMENTS 4,880,512 A    11/1989  Cornelius et al.
5,380,411 A  *  1/1995  Schlief ..................... 204/157.15
(Continued)

FOREIGN PATENT DOCUMENTS

| CA | 2 330 790 | 11/1999 |
|----|-----------|---------|
| JP | 60-188161 | 9/1985 |

(Continued)

OTHER PUBLICATIONS

Levy et al, "Nanochemistry: Synthesis and Characterization of Multifunctional Nanoclinics for Biological Applications," Chem. Mater. 2002, (14), pp. 3715-3721.*
(Continued)

*Primary Examiner* — Colleen M Raphael
(74) *Attorney, Agent, or Firm* — Finnegan, Henderson, Farabow, Garrett & Dunner, LLP

(57) ABSTRACT

It is intended to provide a method whereby a target to be analyzed can be easily decomposed in a micro region and a decomposition apparatus. In the decomposition method of decomposing the target to be analyzed and the decomposition apparatus, the target is allowed to coexist with a microparticle and then the microparticle is put into the high-energy state. Then, the target located in the vicinity of the surface of the microparticle is decomposed due to the energy transfer from the high-energy microparticle toward the target. Thus, the target can be easily decomposed in a micro region.

4 Claims, 9 Drawing Sheets

(56) References Cited

U.S. PATENT DOCUMENTS

| | | | |
|---|---|---|---|
| 6,050,990 A * | 4/2000 | Tankovich et al. | 606/9 |
| 6,165,440 A * | 12/2000 | Esenaliev | 424/1.11 |
| 6,167,313 A * | 12/2000 | Gray et al. | 607/103 |
| 6,258,378 B1 * | 7/2001 | Schneider et al. | 424/450 |
| 6,530,944 B2 | 3/2003 | West et al. | |
| 6,685,927 B2 * | 2/2004 | Sumian et al. | 424/73 |
| 6,955,639 B2 * | 10/2005 | Hainfeld et al. | 977/728 |
| 6,989,007 B2 * | 1/2006 | Shadduck | 606/4 |
| 7,263,445 B2 * | 8/2007 | Fritzsche et al. | 977/810 |
| 2002/0103517 A1 | 8/2002 | West et al. | |
| 2002/0197645 A1 | 12/2002 | Martin | |
| 2003/0082633 A1 | 5/2003 | Martin et al. | |
| 2003/0219892 A1 * | 11/2003 | Palsson et al. | 435/325 |
| 2007/0187226 A1 * | 8/2007 | Fujii | 204/157.15 |
| 2007/0292353 A1 * | 12/2007 | Levy et al. | 977/911 |
| 2008/0160090 A1 * | 7/2008 | Oraevsky et al. | 424/489 |
| 2012/0046593 A1 * | 2/2012 | Oraevsky et al. | 977/904 |

FOREIGN PATENT DOCUMENTS

| | | |
|---|---|---|
| JP | 4-152296 | 5/1992 |
| JP | 5-317047 | 12/1993 |
| JP | 6-81151 | 3/1994 |
| JP | 6-502549 | 3/1994 |
| JP | 9-75670 | 3/1997 |
| JP | 9-122479 | 5/1997 |
| JP | 10-508181 | 8/1998 |
| JP | 10-508581 | 8/1998 |
| JP | 2001-136970 | 5/2001 |
| JP | 2002-513590 | 5/2002 |
| JP | 2003-522149 | 7/2003 |
| JP | 2003-286509 | 10/2003 |
| JP | 2004-49105 | 2/2004 |
| JP | 2004-67657 | 3/2004 |
| JP | 2004-74018 | 3/2004 |
| JP | 2004-97910 | 4/2004 |
| JP | 2004-201701 | 7/2004 |
| JP | 2004-223345 | 8/2004 |
| JP | 2004-524134 | 8/2004 |
| JP | 2004-358583 | 12/2004 |
| JP | 2006-501050 | 1/2006 |
| WO | WO 93/03150 | 2/1993 |
| WO | 95/24489 | 9/1995 |
| WO | WO 95/24489 | 9/1995 |
| WO | 96/09315 | 3/1996 |
| WO | WO 2004/023144 | 3/2004 |

OTHER PUBLICATIONS

Kimura-Suda et al, "Base-Dependent Competitive Adsorption of Single-Stranded DNA on Gold," JACS Communications 125 (2003), pp. 9014-9015.*

Demers et al, "Thermal Desorption Behavior and Binding Properties of DNA Bases and Nucleosides on Gold, " JACS Communications 124 (2002), pp. 11248-11249.*

N.H. Jang, "The Coordination Chemistry of DNA Nucleosides on Gold Nanoparticles as a Probe by SERS," Bull. Korean Chem. Soc. 2002, vol. 23, No. 12, pp. 1790-1800.*

Peng et al, "Influence of Intense Pulsed Laser Irradiation on Optical and Morphological Properties of Gold Nanoparticle Aggregates Produced by Surface Acid-Base Reactions," Langmuir vol. 21, No. 10, pp. 4249-4253, May 10, 2005.*

Gearheart et al, "Oligonucletide Adsorption to Gold Nanoparticles: a Surface-Enhanced Raman Spectroscopy Study of Intrinsically Bent DNA," J. Phys. Chem. B 2001, 105, pp. 12609-12615.*

Hu et al, "Heat Dissipation for Au Particles in Aqueous Solution: Relaxation Time versus Size," J. Phys. Chem B 2002, 106, pp. 7029-7033.*

Storhoff et al, "Sequence-Dependent Stability of DNA-Modified Gold Nanoparticles," Langmuir 2002, 18, pp. 6666-6670.*

Petrovykh et al, "Quantitative Analysis and Characterization of DNA Immobilized on Gold," JACS (2003) 125, pp. 5219-5226.*

Pitsilides et al, "Selective Cell Targeting with Light-Absorbing Microparticles and Nanoparticles," Biophysical Journal, v. 84 Jun. 2003, pp. 4023-4032.*

O'Neal et al, "Photo-thermal tumor ablation in mice using near infrared-absorbing nanoparticles," Cancer Letters 209 (2004) pp. 171-176.*

Loo et al, "Nanoshell-Enabled Photonics-Based Imaging and Therapy of Cancer," Tech. in Cancer Res. & Treatment., v. 3, No. 1, Feb. 2004, pp. 33-40.*

Zharov et al, "Self-assembling nanoclusters in living systems; application for integrated photothermal nanodiagnostics and nanotherapy," Nanomedicine: Nanotechnology, Biology and Medicine 1 (2005) pp. 326-345.*

Han et al, "Stability of Gold Nanoparticle-Bound DNA toward Biological, Physical, and Chemical Agents," Chem. Biol. Drug Des. 2006; 67: 78-82.*

Li et al, "Assays Based on Differential Adsorption of Single-stranded and Double-stranded DNA on Unfunctionalized Gold Nanoparticles in a Colloidal Suspension," Plasmonics (2007) 4: 165-171.*

Nelson, "The Adsorption of DNA onto Unmodified Gold Nanoparticles," Ph.D. thesis, Univ. Rochester 2008, Sec. 1.3, pp. 5-9.*

Radt et al, "Laser generated micro- and nanoeffects: inactivation of proteins coupled to gold nanoparticles with nano- and pico-second pulses," Laser-Tissue Interactions, Therapeutic Applications, and Photodynamic Therapy, Proc. SPIE vol. 4433 (2001), pp. 16-24.*

Huettman et al, "On the possibility of high-precision photothermal microeffects and the measurement of fast thermal denaturation of proteins," IEEE J. of Selected Topics in Quantum Electronics, vol. 5, No. 4, Jul./Aug. 1999.*

F. Mafune, et al., "Formation of Gold Nanoparticles by Laser Ablation in Aqueous Solution of Surfactant," J. Phys. Chem. B, 105 (2001), pp. 5114-5120.

Abstract of PCT WO 01/58458 A1 published Aug. 16, 2001.

Notice for Grounds for Rejection for Japanese Patent Appl. No. 2005-136262 dated Feb. 15, 2011.

Notice of Grounds for Rejection for JP Application No. 2005-136262 dated May 10, 2011.

Response to Restriction Requirement as-filed in U.S. Appl. No. 11/713,749 on May 21, 2010 (2 pages).

Office Action Issued in U.S. Appl. No. 11/713,749, Mailed Apr. 23, 2010 (6 pages).

Office Action Issued in U.S. Appl. No. 11/713,749, Mailed Aug. 17, 2010 (8 pages).

Reply of Office Action filed in U.S. Appl. No. 11/713,749 on Nov. 17, 2010 (16 pages).

Office Action Issued in U.S. Appl. No. 11/713,749, Mailed Jan. 24, 2011 (9 pages).

Supplemental Reply After Final Under 37 C.F.R. § 1.116 filed in U.S. Appl. No. 11/713,749 on May 24, 2011 (11 pages).

Reply After Final Under 37 C.F.R. § 1.116 filed in in U.S. Appl. No. 11/713,749 on May 19, 2011 (10 pages).

Notice of Grounds for Rejection for JP Application No. 2005-136262 Mailed Oct. 11, 2011.

Degradation—definition of degradation by the Free Online Dictionary, Thesaurus and Encyclopedia, http://www.thefreedictionary.com/p/degradation, 3 pages, Accessed Jan. 18, 2011.

Warters et al., DNA Degradation in Chinese Hamster Ovary Cells after Exposure to Hyperthermia: Cancer Research 42, 4427-4432, Nov. 1982.

Neubauer et al., "DNA Degradation at Elevated Temperatures after Plasmid Amplification in Amino Acid-Starved *Escherichia Coli* Cells" Biotechnology Letters, vol. 18, No. 3 (Mar. 1996) pp. 321-326.

Alivisatos et al., "Organization of 'nanocrystal molecules' using DNA," Nature, vol. 382, Aug. 15, 1996, pp. 609-611.

Evans, K. et al., "Evaluation of Degradation Pathways for Plasmid DNA in Pharmaceutical Formulations via Accelerated Stability Studies," Journal of Pharmaceutical Sciences, vol. 89, No. 1, Jan. 2000, pp. 76-87.

Office Action issued in U.S. Appl. No. 11/713,749, mailed Dec. 13, 2013 (19 pages).

(56) References Cited

OTHER PUBLICATIONS

Takahashi et al., "Controlled release of plasmid DNA from gold nanorods induced by pulsed near-infrared light," *Chem. Comm.*, 2005, 2247-2249.

Gerwitz, D.A., "Growth arrest and cell death in the breast tumor cell in response to ionizing radiation and chemotherapeutic agents which induce DNA damage," *Breast Cancer Res. & Treatment*, 62:223-25, 2000.

Notice Grounds of Rejection for JP Application No. 2005-297943 dated Feb. 15, 2011.

Notice of Grounds for Rejection for JP Appl. No. 2005-136262 dated Jul. 26, 2011.

Office Action for U.S. Appl. No. 11/713,749 dated Sep. 17, 2014.

* cited by examiner

METHOD OF DECOMPOSING TARGET AND DECOMPOSITION APPARATUS

TECHNICAL FIELD

The present invention relates to a method of decomposing a target, the method decomposing a target which is to be a subject of decomposition in a micro region and also to a decomposition apparatus.

BACKGROUND ART

As a method of decomposing and removing a target which is to be a subject of decomposition, for example, a method of decomposing a target by using a discharge plasma under vacuum or an atmosphere is conventional. This is a method in which molecules in the atmosphere are ionized or dissociated by a discharge plasma to thereby generate positive polarity ions, negative polarity ions and electrons, thereby decomposing and removing harmful substances, such as nitrogen oxides (NOx), volatile organic compounds (VOC), viruses and bacteria in the air.

Also, in the publication of JP 9-75670 A, a method of treating organic pollutants is described in which an organic pollutant treating system including a material having at least one of organic pollutant adsorbing ability, organic pollutant decomposability and microwave absorbing ability, or a combination of these materials and provided with these three characteristics, is allowed to occlude organic pollutants existing in the atmosphere by bringing these pollutants into contact with the system at normal temperature and the treating system is then heated by irradiation with microwaves in an air stream.

Also, in the publication of JP 4-152296 A, a method is described in which a photoelectron releasing material prepared by adding a material which has a relatively large work function and releases photoelectron upon irradiation with ultraviolet rays and/or radial rays to a mother material is used to charge microparticles in gas, thereby collecting and removing these microparticles to obtain purified gas.

In the meantime, as a method of decomposing and removing targets, methods removing targets in a structure partitioned by membranes, for example, a method of removing targets in cells, are conventional. In the case of examining, for example, the function of a protein molecule, or DNA or RNA molecule inside cells or solutions, there are cases where the molecule is decomposed and removed to observe whether the function is developed or not. In this case, when removing some targets from a solution in which a mixture including the targets is dispersed, microparticles whose surfaces are so modified as to have affinity to the targets are introduced, and these microparticles are removed from the solution by using a method such as a centrifuging action to thereby remove these targets at the same time.

DISCLOSURE OF THE INVENTION

However, the method using a discharge plasma to decompose targets involves a difficulty in generating a plasma while controlling a space and time, and in decomposing specified targets in a mixture. Also, a usual discharge plasma generation region has a size of (approximately 1 mm)$^3$ or more and as this region is smaller, the selectivity of decomposition of targets is more improved. However, few simple methods of decomposing targets in a micro region, for example having a level of (1 nm)$^3$ to (approximately 100 nm)$^3$ are conventional.

Also, even in the methods described in each of publications JP-A Nos. 9-75670 and 4-152296, it is difficult to decompose targets in a micro region, for example having a level of (1 nm)$^3$ to (approximately 100 nm)$^3$.

Moreover, with regard to the method in which microparticles whose surface are so modified as to have affinity to targets are introduced and these microparticles are removed from a solution by a centrifuging action or the like, it is difficult to use this method in a system such as, for example, a micro region like the inside of a membrane structure such as cells, for which such a method of removing microparticles by a centrifuging action is unsuitable.

The present invention relates to a method and an apparatus for decomposing a target, the method and apparatus ensuring that targets which are decomposition subjects can be simply decomposed in a micro region.

The present invention relates to a method of decomposing a target, wherein the target which is a subject of decomposition is decomposed, the method including making the target and microparticles coexist and putting the microparticles into a high-energy state, and decomposing the target existing in the vicinity of the surface of the microparticles by energy transfer from the microparticles put into the high-energy state to the target.

Also, in the method of decomposing a target, a generated region having the high energy is preferably a micro region.

Also, in the method of decomposing a target, preferably the target is made to exist in the vicinity of the surface of the microparticles and the microparticles are put into the high-energy state to selectively decompose the target existing in the vicinity of the surface of the microparticles.

Also, in the method of decomposing a target, the microparticles are preferably irradiated with at least one of an electromagnetic wave, sound wave and ultrasonic wave to thereby put the microparticles into the high-energy state.

Also, in the method of decomposing a target, the electromagnetic wave is preferably a laser.

Also, in the method of decomposing a target, the microparticles are metal microparticles.

Also, the present invention relates to a decomposition apparatus for decomposing a target, wherein the target which is a subject of decomposition, the apparatus including a receiving section used to make the target and microparticles coexist and an energy supply device for putting the microparticles into a high-energy state, wherein the target existing in the vicinity of the surface of the microparticles is decomposed by energy transfer from the particles put into the high-energy state to the target.

Also, the decomposition apparatus for decomposing a target, the apparatus further including a dispersing device for dispersing the target and the microparticles in the receiving section.

In a method of decomposing a target and a decomposition apparatus for decomposing a target which is a subject of decomposition in the present invention, the target and the microparticles are made to coexist and the microparticles are put into a high-energy state to decompose the target existing in the vicinity of the surface of the microparticles by the energy transfer from the microparticles put into a high-energy state to the target, whereby the target can be simply decomposed in a micro region.

BEST MODE FOR CARRYING OUT THE INVENTION

Embodiments according to the present invention will be explained. It is to be noted that the term "high-energy state" in this specification means being in an energy state higher at least than its usual state. This includes the states of the structural particles of the microparticles, or ions, electrons or radicals of these structural microparticles having thermal energy or high energy obtained by rotation-vibration excitation of the atoms or molecules constituting the microparticles, excitation of electrons, bulk excitation of electrons and the release of these excited states and a plasma state of these structural particles. This high-energy state also includes the case where these energies are released by the surrounded solvent with the result that the solvent itself is put into a high-energy state, a state of material not existing in normal temperature and pressure condition and a high-pressure state.

Also, the term "the vicinity of the surface" specifically means a range of 100 nm or less, preferably 10 nm or less and more preferably 1 nm or less from the surface of the microparticle in the direction of the inside or outside of the microparticle.

Figure 1:
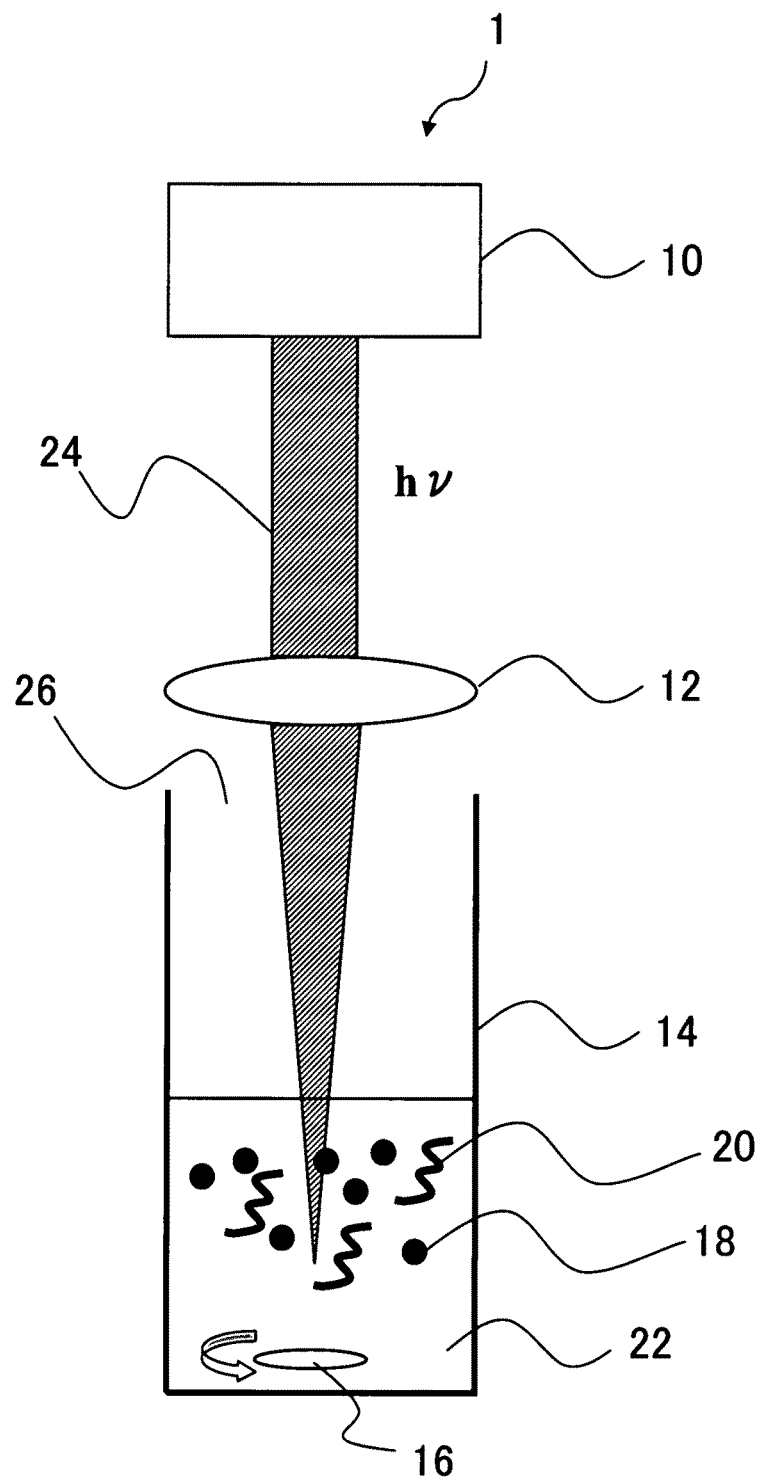
FIG. 1 is a view showing an example of the structure of a decomposition apparatus for decomposing a target according to an embodiment of the present invention.

FIG. 1 shows the outline of an example of a decomposition apparatus for decomposing a target according to the embodiment of the present invention. The structure of the apparatus will be explained. The decomposition apparatus 1 is provided with a laser generating device 10 which is an energy supply device, a lens 12 which is a light converging device, a cell 14 which is a receiving section and a stirrer 16 which is a dispersing device.

To explain in more detail, in the decomposition apparatus 1, the stirrer 16 is disposed on the inside bottom of the cell 14 having, for example, a bottomed square cylinder form, the lens 12 is disposed above an opening 26 of the cell 14 in FIG. 1, and the laser generating device 10 is disposed above the lens 12 in FIG. 1.

Next, the method of decomposing a target and actions of the decomposition apparatus 1 according to the embodiment will be explained with reference to FIG. 1. First, a reaction solution 22 containing microparticles 18 and a target 20 is prepared and poured into the cell 14. At this time, the microparticles 18 are in a state in which they are dispersed in the reaction solution 22. Though the target 20 may be in a state in which it is dissolved or dispersed in the reaction solution 22, it is preferably dissolved in the reaction solution 22 from the viewpoint of, for example, improving decomposition efficiency.

Thereafter, the reaction solution 22 is stirred by the stirrer and at the same time, a laser 24 emitted from the laser generating device 10 is converged by the lens 12 and applied to the reaction solution 22 in the cell 14. When the laser 24 is applied to the reaction solution 22 in which the microparticles 18 and the target 20 coexist at a given intensity for a given time, the microparticles 18 are put into a high-energy state. Energy is transferred to the target 20 from the microparticles 18 put into a high-energy state whereby the target 20 existing in the vicinity of the surface of the microparticles 18 is decomposed. When the laser 24 is applied to the reaction solution 22, the laser 24 is preferably converged at the inside of the reaction solution 22 by a light converging device such as the lens 12 to improve decomposition efficiency and positional selectivity.

Examples of the microparticles to be used in this embodiment include metal microparticles, nonmetal microparticles and polymer microparticles. The microparticles may be made into complex microparticles by compounding organic dyes or the like absorbing a laser or the like. Moreover, the surface of the microparticles may be modified to make the microparticles have affinity to the target.

As the metal microparticles, any microparticle may be used insofar as it is a microparticle of a typical metal or a transition metal. Examples of the metal microparticles include transition metals such as Ti, V, Cr, Mn, Fe, Co, Ni, Cu, Sc, Y, Zr, Nb, Mo, Tc, Hf, Ta, W, Au, Ag, Ru, Rh, Pd, Os, Ir, Pt, Re, lanthanoid and actinoid, Zn, Cd, Hg, Al, Ga, In, Tl, Si, Ge, Sn, Pb, As, Sb and Bi. Among these transition metals, Au, Ag, Ru, Rh, Pd, Os, Ir, Pt, Cu, Fe, Ni, Co, Cr, Mn, Mo, W, Ta and Nb are more preferable, precious metals such as Au, Ag and a platinum group (Ru, Rh, Pd, Os, Ir, Pt) are more preferable because these metals are resistant to oxidation and Au and Pt are particularly preferable. Also, metal microparticles having strong photoabsorption such as surface plasmon resonance and interband transition are preferable. Also, metal microparticles such as Au, Ag and Cu having a surface plasmon resonance band in the visible region are more preferable. Also, microparticles of complex metals such as GaAs, GaTe and CdSe may be used.

Examples of the nonmetal microparticles include microparticles of organic compounds such as organic dyes and organic pigments and inorganic compounds such as inorganic pigments.

Examples of the polymer microparticles include microparticles of polystyrene, polyethylene, polypropylene and latex. Also, organic compounds such as organic dyes and organic pigments, and inorganic compounds such as inorganic pigments may be contained in polymer microparticles or groups having large photoabsorption may be chemically bonded to the polymer microparticles.

The average particle diameter of microparticles is preferably 100 µm or less, more preferably in a range from 1 nm to 100 nm and still more preferably 5 nm to 20 nm in the point, for example, that the microparticles preferably have high dispersibility in a solution. When the average particle diameter of the metal microparticles is less than 1 nm, the wavelength of the laser to be applied tends to be a short wave, and there is the possibility that the operation is complicated. Also, because the region where a decomposition reaction of the target is run can be controlled by the size of the average particle diameter of the microparticles, the average particle diameter of microparticles may be selected corresponding to, for example, the object of decomposition. In this case, the average particle diameter of the microparticles may be measured using a light scattering measuring device manufactured by Otsuka Electronics Co., Ltd or the like.

Examples of the method of producing the metal microparticles include a SF-LAS (Surfactant-free laser ablation in solution) method in which the surface of a metal plate is ablated in a liquid such as water by laser irradiation or microwave irradiation, a SC-LAS (Surfactant-controlled laser ablation in solution) method in which the surface of a metal plate is ablated in a liquid such as water to which a surfactant is added, by laser irradiation or microwave irradiation, a method of chemically reducing and a method of discharging in a solution, and there is no particular limitation to the method. The addition of a surfactant to the metal microparticles is preferable because, for example, the metal microparticles can be stabilized and the operation is easy in terms of production.

As the surfactant, an anionic type, cationic type, nonionic type or amphoteric type surfactants may be used. As the surfactant, sodium dodecylsulfate (SDS) can usually be used from the viewpoint of, for example, the solubility of the surfactant and stabilization of the metal microparticles in a solvent.

No particular limitation is imposed on the target which is a subject of decomposition in this embodiment. Examples of the target include biological macromoleules, membrane partitioned structures such as cells and environmental substances such as dioxin and PCB.

The biological macromolecule means high-molecular compounds synthesized in living bodies and examples of the biological macromolecules include proteins, nucleic acids such as DNA and RNA and polysaccharides.

As the solvent to be used in the reaction solution 22, water or general organic solvents may be used though any solvent may be used insofar as it can disperse the microparticles 18 uniformly and can disperse or dissolve the target 20 uniformly. Examples of the water include city water, ground water, pure water such as ion exchange water and ultra-pure water, though any type of water may be used. In order to improve decomposition efficiency, it is better that impurities are reduced and therefore pure water such as ion exchange water and ultra-pure water can usually be used. As the organic solvent, alcohol type solvents such as methanol, ethanol and isopropyl alcohol; aromatic type solvents such as benzene and toluene; halogen type solvents such as methylene chloride, chloroform and carbon tetrachloride; straight-chain saturated hydrocarbon solvents such as n-hexane and n-heptane; cyclic hydrocarbon type solvents such as cyclohexane; acetonitrile and the like may be used. Among these solvents, water and alcohol type solvents are preferable and water is more preferable in view of a wide range of applications.

The concentration of the microparticles 18 in the reaction solution 22 can usually be in a range from 0.1 µg/mL to 1000 µg/mL, though no particular limitation is imposed on it insofar as it is a concentration increased to a sufficient extent to suspend and disperse the microparticles 18. There is no particular limitation to the ratio of the amount of the target to the amount of the metal microparticles in the reaction solution.

Although no particular limitation is imposed on the material used for the cell 14 which is the receiving section where the target and the microparticles are made to coexist, materials such as quartz and glass can usually be used. The receiving section may be a substrate of glass, silicon or an organic polymer such as an acryl material or an inorganic material such as sapphire or alumina in place of the cell 14.

Though in this embodiment, the target is irradiated with a laser to put the microparticles into a high-energy state, no particular limitation is imposed on the means used to put the target into a high-energy state. For example, electromagnetic waves such as microwaves, visual light, ultraviolet light, infrared light, X-rays, or γ-rays or sonic waves (elastic wave) may be applied. As the electromagnetic waves, microwaves, visible light, ultraviolet light and infrared light are preferable and the electromagnetic waves may be a laser. Also, as the sound wave, a ultrasonic wave is preferable.

As mentioned above, the term "high-energy state" means being in an energy state higher at least than its usual state. In the case of applying, for example, a pulse laser light having a wavelength of 532 nm, the microparticles absorb laser light by one-photon absorption and are put into a state higher by about 5 eV than its usual state.

The area where the laser 24 or the like is converged in the reaction solution 22 is in a range from $(1 \text{ µm})^3$ to $(1 \text{ mm})^3$ and preferably $(1 \text{ µm})^3$ to $(0.2 \text{ mm})^3$. It may be difficult to narrow, the light convergence region smaller than about $(1 \text{ µm})^3$ due to mechanical restrictions. When the light convergence region is in a range larger than about $(1 \text{ mm})^3$, there are cases where the decomposition efficiency is deteriorated. Also, the laser 24 or the like may be applied either pulse-wise or continuously.

No particular limitation is imposed on the intensity of the laser 24 to be applied to the reaction solution 22 insofar as the microparticles 18 are put into a high-energy state to decompose the target 20 with efficiency. The intensity is in a range preferably from 100 µJ/pulse to 100 mJ/pulse and more preferably 5 mJ/pulse to 20 mJ/pulse in the case of a pulse laser. In the case of a continuous wave laser (CW laser), the intensity is in a range preferably from 0.1 mW to 10 W. When the intensity of the laser 24 is large, the efficiency in decomposing the target 20 can be increased. When the intensity of irradiation of the laser 24 is less than 100 µJ/pulse, there are cases where the decomposition of the target 20 does not proceed whereas when the intensity is larger than 100 mJ/pulse, there are cases where dielectric breakdown of the solvent itself is caused though depending on the size of the light convergence region and there are also cases where the container (cell) is damaged. Because the intensity of the laser 24 or the like is made higher, the amount of the target 20 to be decomposed is increased, and therefore, if the intensity of the laser is adjusted, the decomposition amount of the target 20 can be controlled.

The time required to irradiate the reaction solution 22 with the laser 24 may be decided according to the decomposability of the target 20 which is a subject of decomposition or the like and no particular limitation is imposed on the time. The time can usually be in a range from the time of one pulse width to 100 minutes and preferably in a range from the time of one pulse width to 10 minutes. In the case of a pulse laser, no particular limitation is imposed on pulse frequency, although the pulse frequency is preferably in a range from 5 Hz to 20 Hz.

As the wavelength of the laser 24 or the like to be applied to the reaction solution 22, it is preferable to select a wavelength enabling the microparticles to be put into a high-energy state corresponding to the type of the microparticles 18. When for example, metal microparticles are used as the microparticles 18, the wavelength is preferably a wavelength close to the surface plasmon resonance wavelength, a wavelength at which the metal microparticles have a large absorption coefficient and a wavelength close to interband transition of the metal microparticles or the like. Here, the above large absorption coefficient is preferably absorption as strong as 100 $M^{-1}cm^{-1}$ or more. When the microparticles 18 are, for example, gold microparticles, it is preferable to use a wavelength of 532 nm close to the surface plasmon resonance wavelength of these gold microparticles. When the microparticles 18 have no particularly strong absorption in the visible region like the case of platinum microparticles, a laser having any wavelength may be used. When the microparticles 18 do not absorb the laser 24 or the like, or have low efficiency in absorbing the laser 24, organic dyes and the like absorbing the laser 24 or the like may be contained in the microparticles 18 as mentioned above.

As to the type of the laser 24 to be used, it may be selected in accordance to the wavelength of the laser to be applied and there is no particular limitation to its type. As the laser 24, a semiconductor laser, solid laser, gas laser, dye laser, excimer laser or the like may be used.

The laser 24 to be applied to the reaction solution 22 is preferably applied through an opening part of the cell 14. When the laser 24 is applied through the cell 14, there is the possibility of the cell 14 itself being sputtered by the laser and damaged depending on the intensity of the laser 24. For this reason, the cell 14 is preferably a transparent material. The laser 24 is, as shown in FIG. 1, applied through an opening 26 on the upper surface of the cell 14.

The temperature of the reaction solution 22 may be in a range from 0° C. to 100° C. and usually an ambient temperature range from 10° C. to 30° C., though no particular limitation is imposed on it insofar as it is a temperature at which the target is efficiently decomposed.

In the decomposition method according to this embodiment, it may be unnecessary to particularly apply pressure to the reaction system when the laser or the like is applied and the decomposition can usually be carried out under normal pressure. It is to be noted that a pressure ranging from 0.2 MPa to 100 MPa may be applied to the reaction system.

The reaction solution 22 poured into the cell 14 is preferably stirred by a dispersing device such as the stirrer 16 and a stirring blade to disperse the microparticles 18 and target 20 contained in the reaction solution 22. The dispersion operation may be carried out using a ultrasonic wave besides the stirring as the dispersing device. The laser can be applied uniformly to the whole reaction solution by the stirring and dispersion process. When the microparticles 18 and target 20 are naturally dispersed without using the dispersing device such as the stirrer 16, the dispersing device may not be used.

The microparticles 18 and the target 20 are dispersed and dissolved in a solvent to apply the laser 24 or the like to the microparticles, whereby energy is transferred from the microparticles 18 put in a high-energy state to the surrounding to decompose the target 20. As the form of the energy transfer, structural particles of the microparticles 18 having thermal energy or high energy or their ions or electrons or the like are considered. When the case where gold microparticles are put into a high-energy state by irradiation with a laser will be explained as an example, the energy of electrons which have absorbed the laser light by the surface plasmon resonance of the gold microparticles may be released and used as oscillation energy of the lattices of the gold microparticles, whereby the gold microparticles having a solid state may start melting. The gold microparticles put into a solution state may be further vaporized and made into an atomic state. It is inferred that high-energy particles such as gold atoms, gold clusters, gold ions, electrons and radicals emitted from the surface of the gold microparticles decompose the target existing in the vicinity of the surface of the gold microparticles. Also, the emitted electrons may be accelerated in a strong laser electric field, the accelerated electrons may collide with the surrounding gold atoms and solvent molecules to ionize these atoms and molecules, and electrons emitted from these atoms and solvent molecules may further collide with the next molecules and be transferred to a high-energy state such as a plasma state like an avalanche. Because it is inferred that these high-energy particles exist in the vicinity of the surface of the microparticles and in a range tens of nanometers or less distant from the surface of the microparticles, only the target existing in the vicinity of the surface of the microparticles may be decomposed.

In general, when a highly intensive laser is applied to a solvent such as water, all materials within the laser light convergence region (for example, $(1\ \mu m)^3$ or more) may be put into a plasma state or the like. In the method according to this embodiment, not all materials in the laser light convergence region may be put into a plasma state or the like, but the vicinity of the microparticles existing in the laser light convergence region may be put into a plasma state or the like. Also, the region put into a plasma state or the like can be controlled by, for example, the size of the average particle diameter of the microparticles and the intensity of the applied laser. Therefore, if appropriate ones are selected as, for example, the size of the average particle diameter of the microparticles and the intensity of the applied laser according to the object of decomposition and the like, the region where the decomposition reaction of the target is caused can be controlled.

Figure 2:
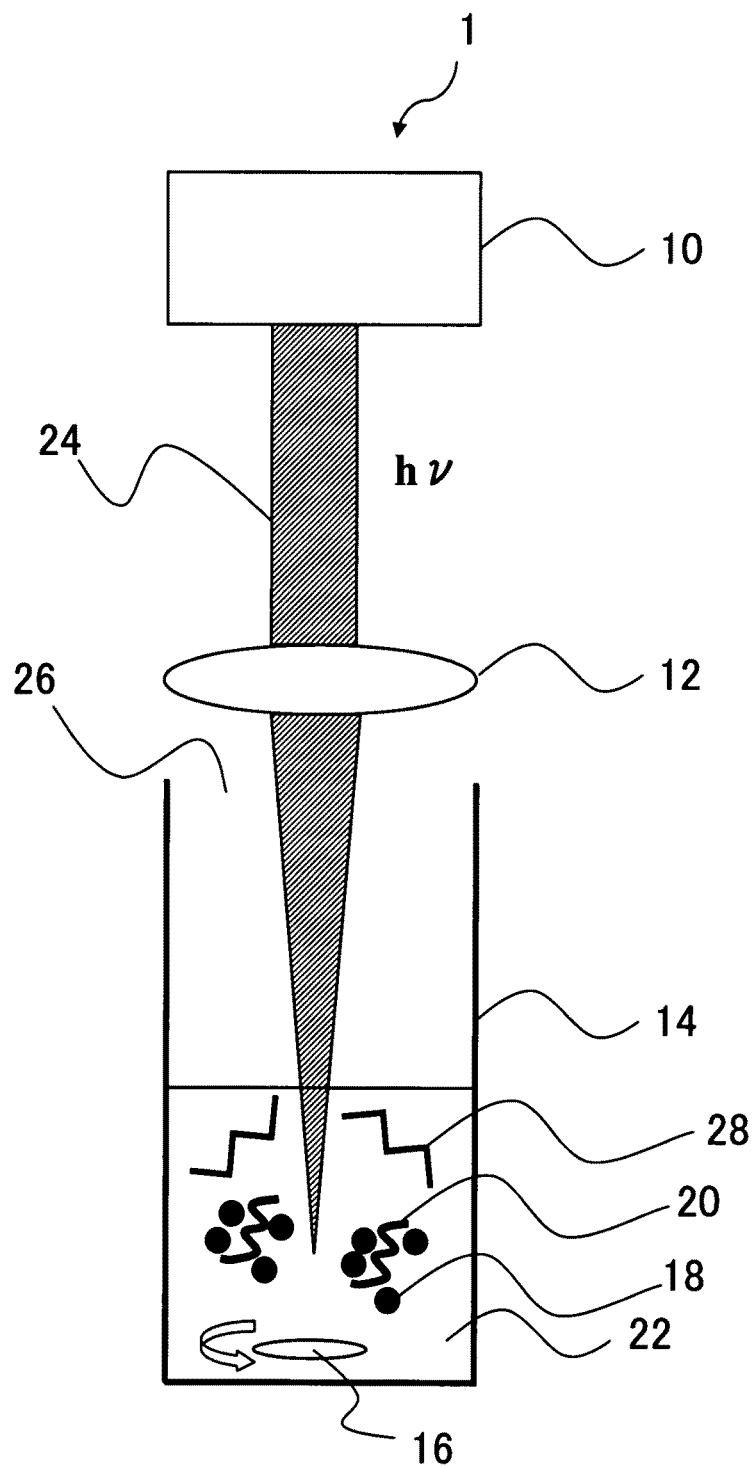
FIG. 2 is a view showing an examples in which microparticles, a target and a non-target are dispersed and dissolved in a solvent to selectively decompose the target in a decomposition apparatus for decomposing a target according to an embodiment of the present invention.

FIG. 1 is to explain an example in which the microparticles 18 and the target 20 are dispersed and dissolved in a solvent, which is then irradiated with the laser 24 or the like to decompose the target 20. Other than this example, the microparticles 18, the target 20 and a non-target 28 may be dispersed and dissolved in a solvent, which is then irradiated with the laser 24 or the like to decompose the target 20 selectively as shown in, for example, FIG. 2.

In this case, the target 20 may be made to exist selectively in the vicinity of the surface of the microparticles 18 by, for example, changing the state of the surface of the microparticles 18 or the target 20 before or after the microparticles 18, the target 20 and the non-target 28 are dispersed and dissolved in a solvent, and then the laser 24 or the like is applied to the microparticles 18, whereby the target 20 can be selectively decomposed. As mentioned above, it is considered that high-energy particles exist in the vicinity of the surface of the microparticles in this embodiment, and therefore, the target to be decomposed may be limited to those existing in the vicinity of the surface of microparticles. The target 20 may be made to selectively exist in the vicinity of the surface of the microparticles 18, whereby the target 20 can be selectively decomposed and the non-target 28 almost not existing in the vicinity of the surface of the microparticles 18 can be scarcely decomposed.

Examples of the method used to make the target 20 selectively exist in the vicinity of the surface of the microparticles 18 include a method in which the target is made to selectively adsorb to the surface of the microparticles by changing the pH of the solution, ionic state of the target 20 or the like, a method in which the surface of the microparticles is modified so as to have affinity to the target, a method in which the surface of the target is modified to have affinity to the microparticles, a method in which the target is chemically bound (for example, ionic bond, covalent bond, coordination bond, metal bond, hydrogen bond and van der Waal's bond) with the surface of the microparticles by proper methods, a method in which the target is made to sorb in such a manner as to penetrate into the vicinity of the surface of the microparticles, and a method in which the microparticles and the target are supported on the surface of a support. Also, affinity to the target may be controlled by the type of surfactant in the metal microparticles mentioned above.

Also, here, the example in which the microparticles 18 and the target 20 are dispersed and dissolved in a solvent and the laser 24 is applied to the microparticles to decompose the target 20 is described. There is also a method in which the microparticles and the target are made to coexist and are supported on a support such as silicon, alumina and titanium oxide. There is also a method in which for structures such as cells in which the outside part and the inside part are separated by a membrane or the like, the microparticles are introduced into the structure to selectively decompose its content or the structure itself.

The decomposition of the target which is caused by the microparticles can be confirmed by measuring, for instance, the ultraviolet visible absorption spectrum, infrared absorption spectrum, nuclear magnetic resonance spectrum of the reaction solution obtained after a laser or the like is applied, or by high-performance liquid chromatography, gas chromatography, electrophoresis or the like.

In the case of, for example, a plasma including high-energy microparticles generated by the method of decomposing a target according to this embodiment, space and time can be easily controlled. Specifically, the method of decomposing a target according to this embodiment can generate a plasma or the like limited in a smaller area, for example, a micro region of the order of $(1 \text{ nm})^3$ to (approximately $100 \text{ nm})^3$ than in the case of using a discharge plasma. This makes it possible to decompose the target existing in the vicinity of the surface of the microparticles. Also, when the microparticles are put into a high-energy state by using a laser or the like, a plasma or the like can be generated with an accuracy as high as the nano-order of 1 fsec to 100 nsec, and therefore the time for the decomposition of the target can be controlled with higher accuracy as compared with the case of discharge plasma.

Also, the microparticles are sealed in membrane structures, for example, cells to put these microparticles in a high-energy state by using a laser or the like, whereby the target existing in the vicinity of the microparticles, such as proteins, DNA and RNA in the case of, for example, cells can be selectively decomposed. In this case, a plasma state or the like may be generated only in the vicinity of the surface of microparticles and therefore, inclusions in other regions may be not broken.

Also, in the case of metal microparticles, these microparticles may be transferred to a high-energy state such as a plasma state by irradiation with a laser or the like to decompose the target in the vicinity of the surface of the microparticles. Then, when the irradiation with a laser or the like is suspended, these microparticles may be recoagulated into the original metal microparticles. Specifically, the method of decomposing a target according to this embodiment is a method enabling microparticles to be reused in the case of using metal microparticles. Therefore, a laser or the like may be applied to metal microparticles repeatedly and there is no limitation on the amount of decomposable targets with respect to the amount of the metal microparticles.

The method and decomposition apparatus for decomposing a target according to this embodiment can be used in all analytical applications, medical applications, applications of investigations of the functions of protein, DNA or RNA molecules or the like.

EXAMPLES

The present invention will be explained in more detail by way of examples, which are, however, not intended to be limiting of the present invention.

Example 1

Decomposition of DNA by Using Gold Microparticles

Gold microparticles which were not stabilized by a surfactant were produced using a SF-LAS (surfactant-free laser ablation in solution) method (see, for example, the publication of JP 2003-286509 A and F. Mafune, J. Kohno, Y. Takeda, T. Kondow and H. Sawabe: J. Phys. Chem. B., 105, (2001), 5114-5120). 25 μL of M13ssDNA having a concentration of $10^{-13}$ M, 10 μL of an aqueous calcium chloride solution having a concentration of 1.0 M and 25 μL of a solution (1.4 nM) in which gold microparticles containing no surfactant were dispersed were mixed to produce a reaction solution. This reaction solution was placed in a glass cell with a bottom having a size of 1 cm×1 cm. This glass cell was then irradiated with a pulse laser which was emitted as a double wave from a YAG laser and had a wavelength of 532 nm, an intensity of 17 mJ/pulse and a pulse frequency of 10 Hz from an opening of the cell for 0, 10, 30 and 50 minutes. The laser light was converged at the inside of the reaction solution in a converged area of about $(0.1 \text{ mm})^3$ by a lens. During this time, a 10-mm-long and 1-mm-wide stirrer was placed on the bottom of the cell to stir the solution by a magnetic stirrer. After that, agarose gel electrophoresis was utilized to classify DNAs by size, thereby detecting the degree of DNA decomposition.

Figure 3:
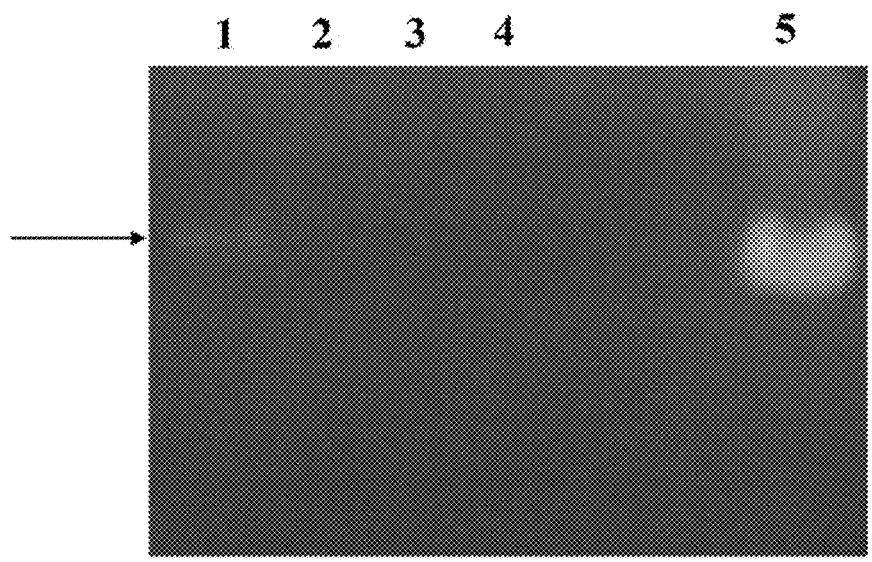
FIG. 3 is a view showing a photograph of electrophoresis after a laser is applied in Example 1 of the present invention; the photograph is a single photograph of a single gel.
Figure 4:
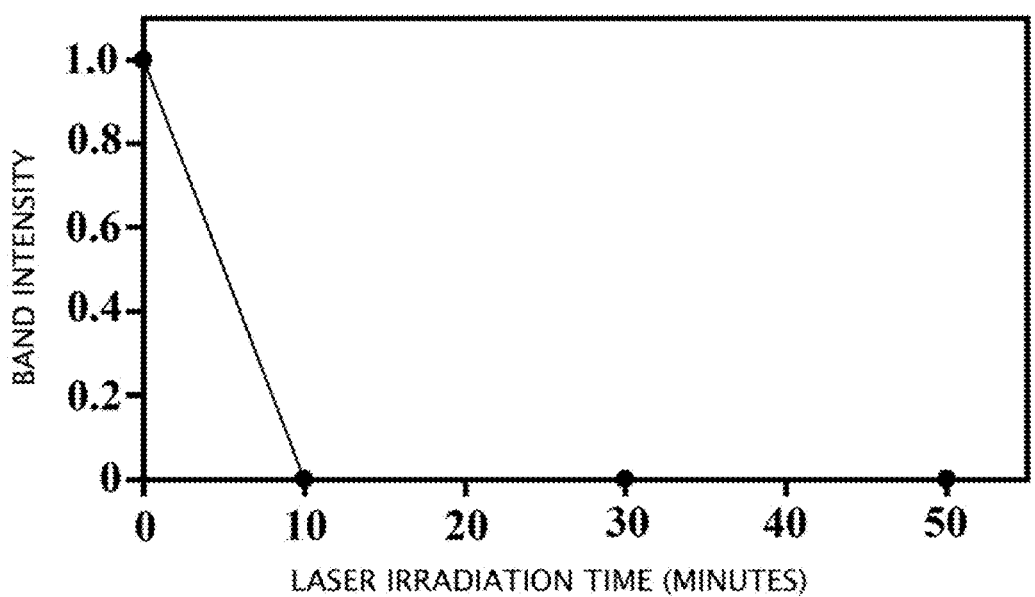
FIG. 4 is a view showing the relationship between the laser irradiation time and the band intensity of electrophoresis in Example 1 of the present invention.

FIG. 3 shows a photograph of electrophoresis after a laser is applied (17 mJ/pulse). The migration was made to take a vertical direction from the top to the bottom. The band of M13ssDNA is shown by the arrow. The lanes 1, 2, 3 and 4 show each band obtained after a laser is applied for 0, 10, 30 and 50 minutes respectively. The band of M13ssDNA increased five-fold in amount is shown in the lane 5 for reference. FIG. 4 shows the relationship between the laser irradiation time and the band intensity of electrophoresis. The abscissa is the laser irradiation time and the ordinate is the amount of M13ssDNA to be detected as a value based on the standard which is the amount of M13ssDNA when the laser irradiation time is 0. As shown in FIG. 4, it is found that M13ssDNA coexisting in the reaction solution is decomposed by irradiating gold particles with a laser.

Comparative Example 1

DNA was decomposed under the same conditions as in Example 1 except that 10 μL of the aqueous 1.0 M calcium chloride solution was not used. No decomposition was caused in the presence of no $Ca^{2+}$. Polyvalent cations including a $Ca^{2+}$ ion may have the ability to bind with a phosphoric acid part in the DNA molecule to neutralize a negative charge of the DNA, thereby neutralizing the DNA in the solution. It is considered that the neutralized DNA adsorbs to the surface of the gold microparticles, whereby the efficiency of the decomposition of DNA is improved by laser irradiation.

Example 2

Decomposition of Lysozyme by Using Gold Microparticles (1)

300 mL of a 1 mg/mL lysozyme solution and 300 mL of a solution in which gold microparticles containing no surfactant were dispersed were mixed to produce a reaction solution. This reaction solution was placed in a glass cell with a bottom having a size of 1 cm×1 cm. This glass cell was then irradiated with a pulse laser which was emitted as a double wave from a YAG laser and had a wavelength of 532 nm, an intensity of 17 mJ/pulse and a pulse frequency of 10 Hz from an opening of the cell for 10, 20, 30, 40 and 50 minutes. The laser light was converged at the inside of the reaction solution in a converged area of about $(0.1 \text{ mm})^3$ by a lens. During this time, a 10-mm-long and 1-mm-wide stirrer was placed on the bottom of the cell to stir the solution by a magnetic stirrer. After that, SDS polyacrylamide gel electrophoresis was utilized to measure the concentration of the migration band of lysozyme, thereby quantitatively detecting the amount of lysozyme to be decomposed.

Comparative Example 2

The reaction solution was irradiated with a laser under the same conditions as in Example 2 except that the gold microparticles were not used.

Figure 5:
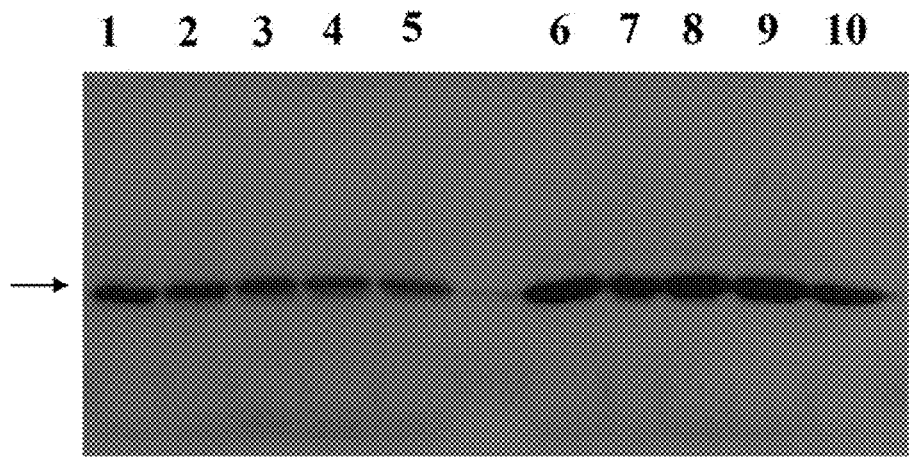
FIG. 5 is a view showing a photograph of electrophoresis after a laser is applied in Example 2 of the present invention and in Comparative Example 2; the photograph is a single photograph of a single gel.
Figure 6:
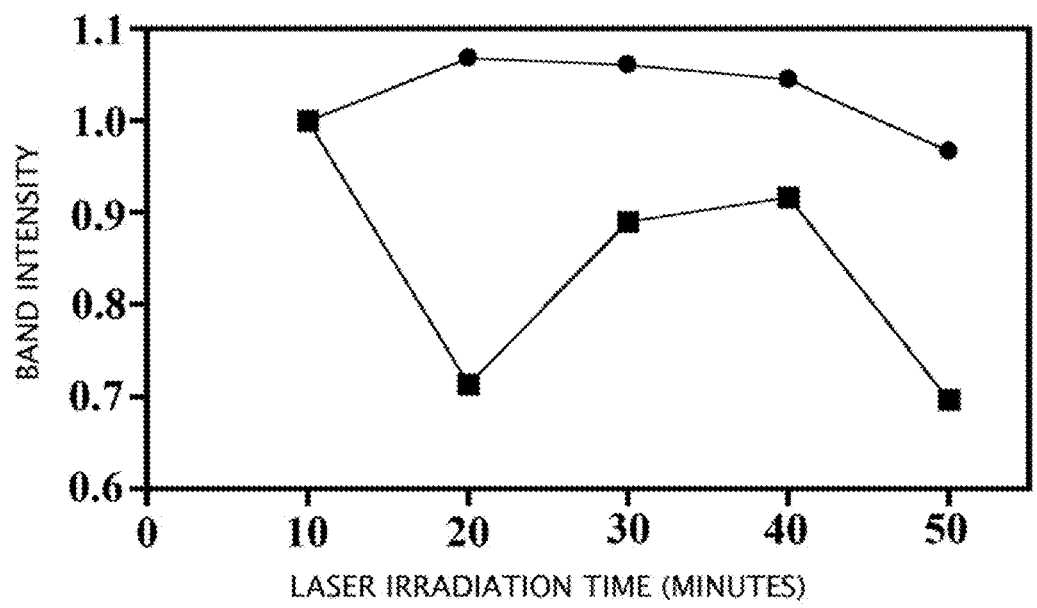
FIG. 6 is a view showing the relationship between the laser irradiation time and the band intensity of electrophoresis in Example 2 of the present invention and in Comparative Example 2.

FIG. 5 shows photographs of electrophoresis after a laser is applied (17 mJ/pulse) in Example 2 and Comparative Example 2. The migration was made to take a vertical direction from the top to the bottom. The band of lysozyme is shown by the arrow. The lanes 1 to 5 show the case of Example 2 in which gold particles were made to coexist and the lanes 6 to 10 show the case of Comparative Example 2 in which the gold particles were not allowed to coexist. In the examples, a laser was applied for 10, 20, 30, 40 and 50 minutes respectively. FIG. 6 shows the relationship between the laser irradiation time and the band intensity of electrophoresis. The abscissa is the laser irradiation time and the ordinate is the amount of lysozyme to be detected as a value based on the standard which is the amount of lysozyme when the laser irradiation time is 10 minutes. The line indicated by the black square shows the case where gold microparticles are made to coexist and the line indicated by the black circle shows the case where gold microparticles are not made to coexist. As shown in the figure, the intensity of the band of lysozyme is decreased by irradiation with a laser in the case of making gold microparticles coexist. It was therefore confirmed that lysozyme was decomposed by high-energy gold microparticles.

Example 3

The reaction solution was irradiated with a laser under the same conditions as in Example 2 except that the laser irradiation intensity was changed to 34 mJ/pulse.

Comparative Example 3

The reaction solution was irradiated with a laser under the same conditions as in Example 3 except that the gold microparticles were not used.

Figure 7:
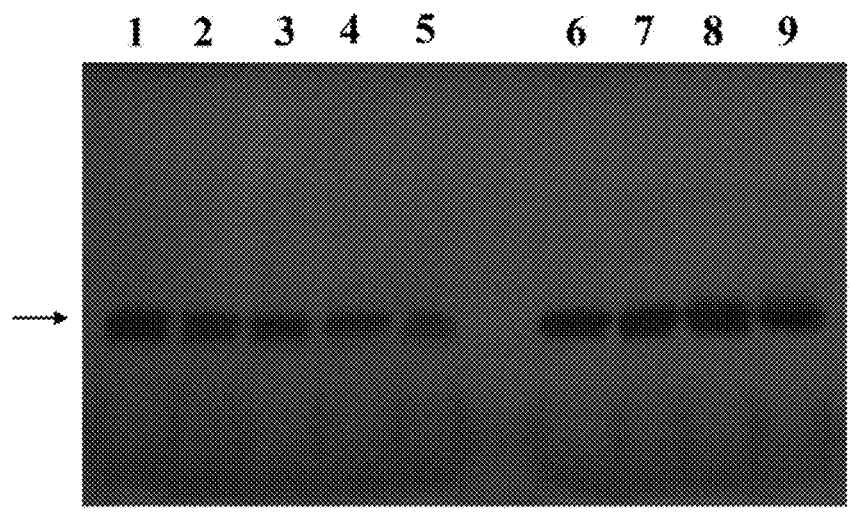
FIG. 7 is a view showing a photograph of electrophoresis after a laser is applied in Example 3 of the present invention and in Comparative Example 3; the photograph is a single photograph of a single gel.
Figure 8:
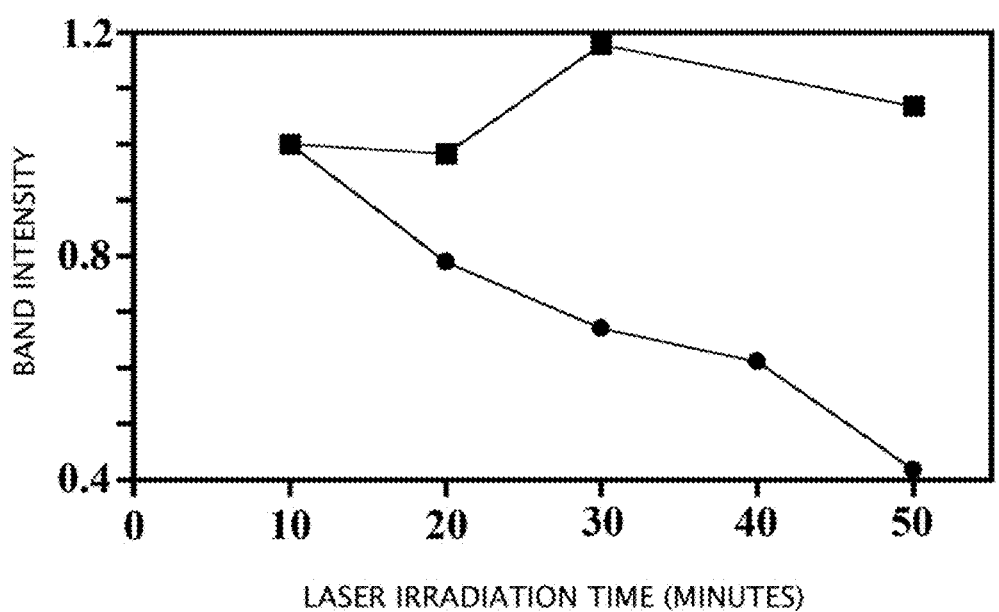
FIG. 8 is a view showing the relationship between the laser irradiation time and the band intensity of electrophoresis in Example 3 of the present invention and in Comparative Example 3.

FIG. 7 shows photographs of electrophoresis after a laser is applied (34 mJ/pulse) in Example 3 and Comparative Example 3. The migration was made to take a vertical direction from the top to the bottom. The band of lysozyme is shown by the arrow. The lanes 1 to 5 show the case of Example 3 in which gold particles were made to coexist and the lanes 6 to 9 show the case of Comparative Example 3 in which the gold particles were not allowed to coexist. In Example 3, a laser was applied for 10, 20, 30, 40 and 50 minutes and in Comparative Example 3, a laser was applied for 10, 20, 30 and 50 minutes. FIG. 8 shows the relationship between the laser irradiation time and the band intensity of electrophoresis. The abscissa is the laser irradiation time and the ordinate is the amount of lysozyme to be detected as a value based on the standard which is the amount of lysozyme when the laser irradiation time is 10 minutes. The line indicated by the black circle shows the case where gold microparticles are made to coexist and the line indicated by the black square shows the case where gold microparticles are not made to coexist.

As shown in the figure, the intensity of the band of lysozyme is decreased in the case of making gold microparticles coexist. It was therefore confirmed that lysozyme was decomposed by high-energy gold microparticles. Also, a comparison of Example 2 (FIG. 6) with Example 3 (FIG. 8) revealed that as the laser intensity is increased, lysozyme decomposition efficiency is higher.

Example 4

Decomposition of Lysozyme by Using Gold Microparticles (2)

300 mL of a 1 mg/mL lysozyme protein solution, 300 mL of a solution in which gold microparticles containing no surfactant were dispersed and 30 mL of a 1 M buffer were mixed to produce a reaction solution. This reaction solution was placed in a glass cell with a bottom having a size of 1 cm×1 cm. This glass cell was then irradiated with a pulse laser which was emitted as a double wave from a YAG laser and had a wavelength of 532 nm, an intensity of 34 mJ/pulse and a pulse frequency of 10 Hz from an opening of the cell for 10, 20, 30, 40 and 50 minutes. The laser light was converged at the inside of the reaction solution in a converged area of about $(0.1 \text{ mm})^3$ by a lens. During this time, a 10-mm-long and 1-mm-wide stirrer was placed on the bottom of the cell to stir the solution by a magnetic stirrer. After that, SDS polyacrylamide gel electrophoresis was utilized to measure the concentration of the migration band of lysozyme, thereby quantitatively detecting the amount of lysozyme to be decomposed. The decomposition reaction was run in two solutions made to have different pHs by using buffers. One of the solutions was adjusted to pH 11.0 by using trishydroxymethylaminomethane (Tris) as the buffer. Another solution was adjusted to pH 6.8 by using phosphoric acid as the buffer.

Figure 9:
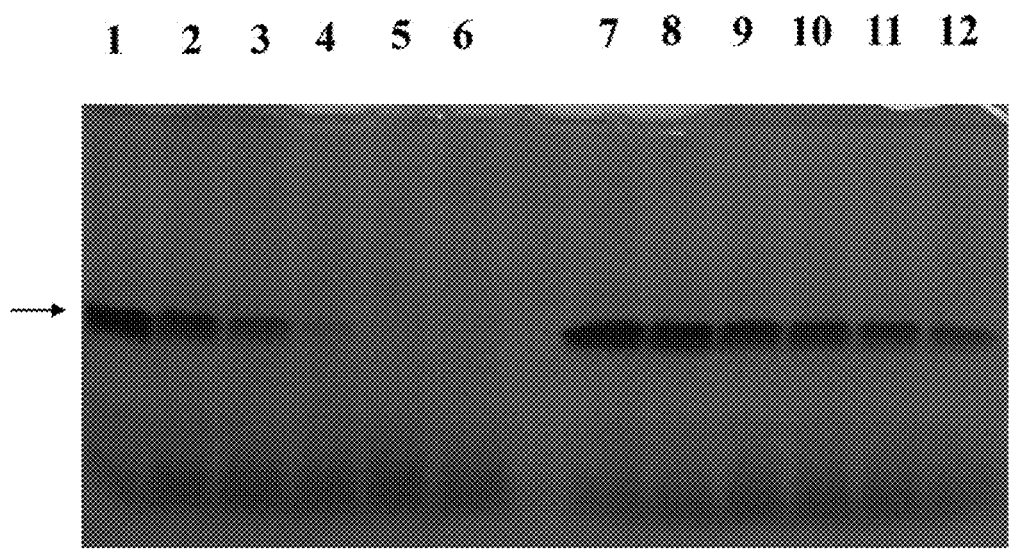
FIG. 9 is a view showing a photograph of electrophoresis after a laser is applied in Example 4 of the present invention; the photograph is a single photograph of a single gel.
Figure 10:
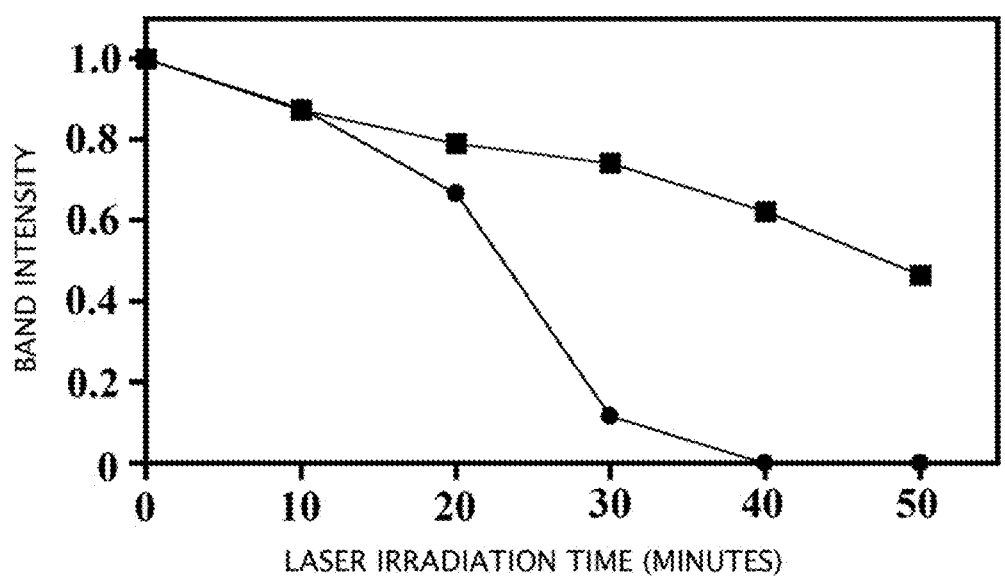
FIG. 10 is a view showing the relationship between the laser irradiation time and the band intensity of electrophoresis in Example 4 of the present invention.

FIG. 9 shows photographs of electrophoresis after a laser is applied (34 mJ/pulse) in Example 4. The migration was made to take a vertical direction from the top to the bottom. The band of lysozyme is shown by the arrow. The lanes 1 to 6 show the case where the pH is 11.0 and the lanes 7 to 12 show the case where the pH is 6.8. A laser was applied for 0, 10, 20, 30, 40 and 50 minutes. FIG. 10 shows the relationship between the laser irradiation time and the band intensity of electrophoresis. The abscissa is the laser irradiation time and the ordinate is the amount of lysozyme to be detected as a value based on the standard which is the amount of lysozyme when the laser irradiation time is 0 minute. The line indicated by the black circle shows the case where the pH is 11.0 and the line indicated by the black square shows the case where the pH is 6.8.

The progress of the decomposition of lysozyme is more advanced in the case of pH 11.0 than in the case of pH 6.8 as shown in the figure. Because the isoelectric point of lysozyme is close to 11.0, the total amount of charge of lysozyme may be close to 0 when the solution is adjusted to pH 11.0. When the pH of the reaction solution is 6.8 on the other hand, lysozyme may carry charges in the reaction solution. Therefore, it is considered that when the pH of the reaction solution is 11.0, lysozyme adsorbs to the surface of gold microparticles and high-energy gold microparticles raise the decomposition efficiency.

Example 5

Decomposition of BSA by Using Gold Microparticles 300 mL of a 1 mg/mL BSA (Bovine Serum Albumin) solution, 300 mL of a solution in which gold microparticles containing no surfactant were dispersed and 30 mL of a 1 M buffer were mixed to produce a reaction solution. This reaction solution was placed in a glass cell with a bottom having a size of 1 cm×1 cm. This glass cell was then irradiated with a pulse laser which was emitted as a double wave from a YAG laser and had a wavelength of 532 nm, an intensity of 34 mJ/pulse and a pulse frequency of 10 Hz from an opening of the cell for 0, 10, 20, 30, 40 and 50 minutes. The laser light was converged at the inside of the reaction solution in a converged area of about $(0.1 \text{ mm})^3$ by a lens. During this time, a 10-mm-long and 1-mm-wide stirrer was placed on the bottom of the cell to stir the solution by a magnetic stirrer. After that, SDS polyacrylamide gel electrophoresis was utilized to measure the concentration of the migration band of BSA, thereby quantitatively detecting the amount of BSA to be decomposed. The decomposition reaction was run in two solutions made to have different pHs by using buffers. One of the solutions was adjusted to pH 11.0 by using trishydroxymethylaminomethane (Tris) as the buffer. Another solution was adjusted to pH 6.8 by using phosphoric acid as the buffer.

Figure 11:
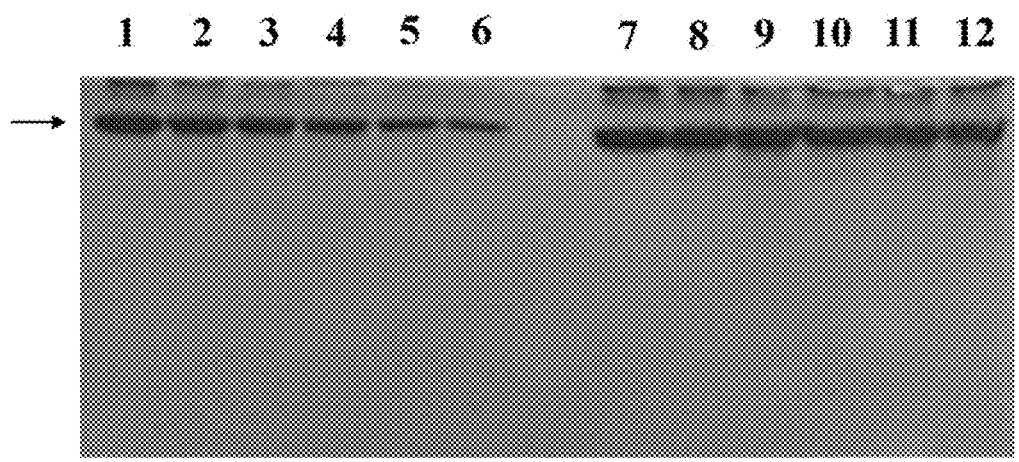
FIG. 11 is a view showing a photograph of electrophoresis after a laser is applied in Example 5 of the present invention; the photograph is a single photograph of a single gel.
Figure 12:
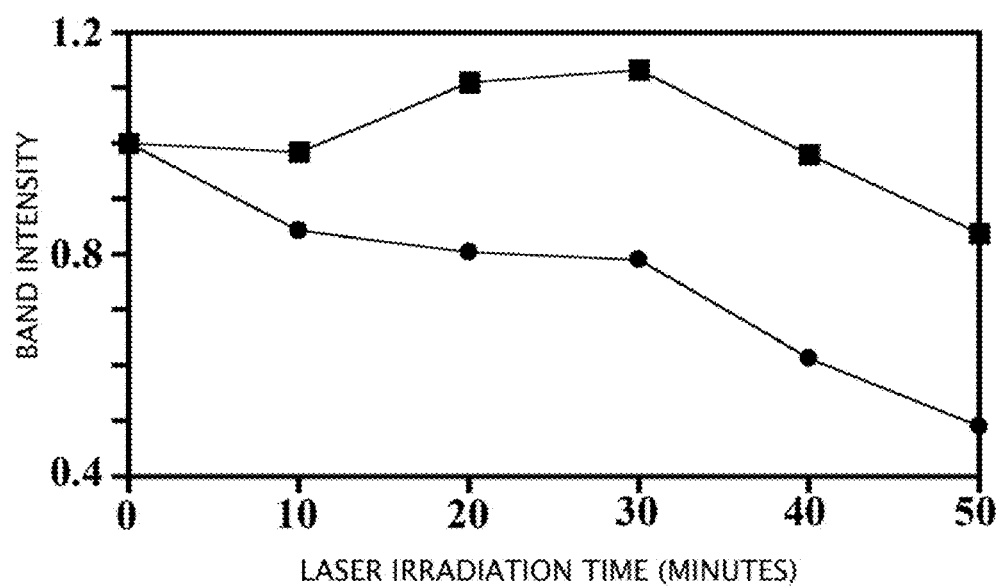
FIG. 12 is a view showing the relationship between the laser irradiation time and the band intensity of electrophoresis in Example 5 of the present invention.

FIG. 11 shows photographs of electrophoresis after a laser is applied (34 mJ/pulse) in Example 5. The migration was made to take a vertical direction from the top to the bottom. The band of BSA is shown by the arrow. The lanes 1 to 6 show the case where the pH is 6.8 and the lanes 7 to 12 show the case where the pH is 11.0. A laser was applied for 0, 10, 20, 30, 40 and 50 minutes. FIG. 12 shows the relationship between the laser irradiation time and the band intensity of electrophoresis. The abscissa is the laser irradiation time and the ordinate is the amount of BSA to be detected as a value based on the standard which is the amount of BSA when the laser irradiation time is 0 minute. The line indicated by the black square shows the case where the pH is 11.0 and the line indicated by the black circle shows the case where the pH is 6.8.

The progress of the decomposition of BSA is more advanced in the case of pH 6.8 than in the case of pH 11.0 as shown in the figure. Because the isoelectric point of BSA is close to 4.9, the total amount of charge of BSA may be close to 0 when the solution is adjusted to pH 6.8. When the pH of the solution is 11.0 on the other hand, BSA may carry charge in the reaction solution. For this reason, it is considered that when the pH of the reaction solution is 6.8, BSA adsorbs to the surface of gold microparticles and high-energy gold microparticles raise the decomposition efficiency.

Example 6

Selective Decomposition of BSA and Lysozyme by Using Gold Microparticles 150 mL of a 1 mg/mL BSA (Bovine Serum Albumin) solution, 150 mL of a 1 mg/mL lysozyme protein solution, 300 mL of a solution in which gold microparticles containing no surfactant were dispersed and 30 mL of a 1 M buffer were mixed to produce a reaction solution. This reaction solution was placed in a glass cell with a bottom having a size of 1 cm×1 cm. This glass cell was then irradiated with a pulse laser which was emitted as a double wave from a YAG laser and had a wavelength of 532 nm, an intensity of 34 mJ/pulse and a pulse frequency of 10 Hz from an opening of the cell for 10, 20, 30, 40 and 50 minutes. The laser light was converged at the inside of the reaction solution in a converged area of about $(0.1 \text{ mm})^3$ by a lens. During this time, a 10-mm-long and 1-mm-wide stirrer was placed on the bottom of the cell to stir the solution by a magnetic stirrer. After that, SDS polyacrylamide gel electrophoresis was utilized to measure the concentration of the migration band, thereby detecting the degrees of decomposition of lysozyme and BSA. The decomposition reaction was run in two solutions made to have different pHs by using buffers. One of the solutions was adjusted to pH 11.0 by using trishydroxymethylaminomethane (Tris) as the buffer. Another solution was adjusted to pH 4.9 by using acetic acid as the buffer.

Figure 13:
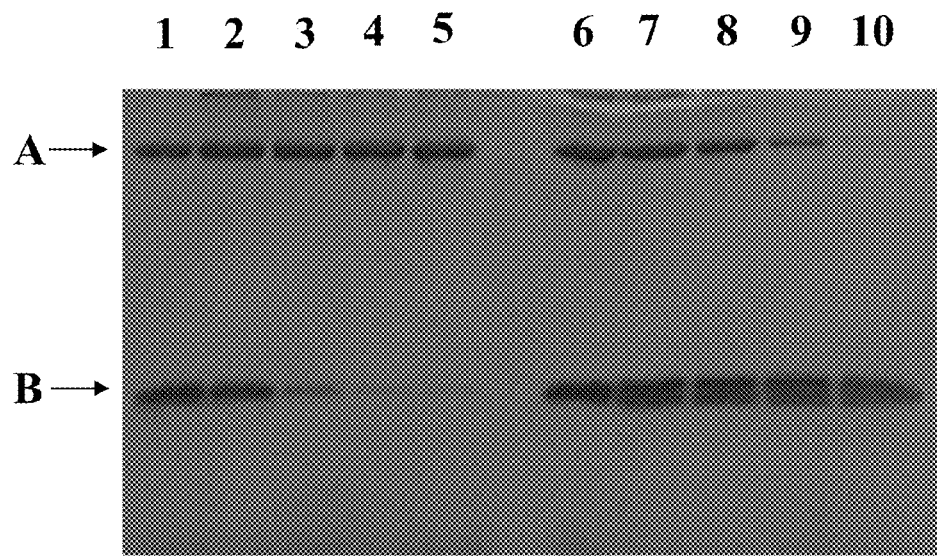
FIG. 13 is a view showing a photograph of electrophoresis after a laser is applied in Example 6 of the present invention; the photograph is a single photograph of a single gel.
Figure 14:
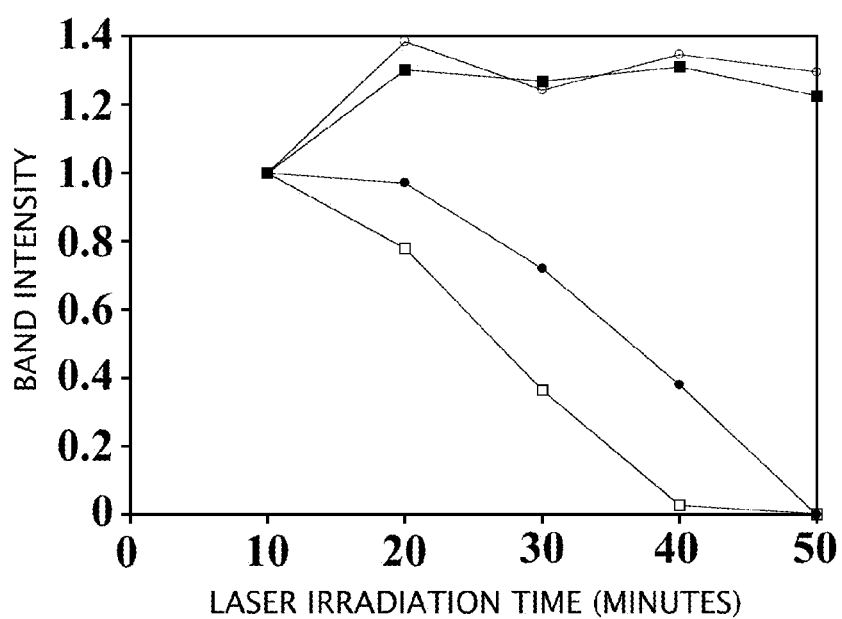
FIG. 14 is a view showing the relationship between the laser irradiation time and the band intensity of electrophoresis in Example 6 of the present invention.

FIG. 13 shows photographs of electrophoresis after a laser is applied (34 mJ/pulse) in Example 6. The migration was made to take a vertical direction from the top to the bottom. The band of BSA is shown by the arrow A and the band of lysozyme is shown by the arrow B. The lanes 1 to 5 show the case where the pH is 11.0 and the lanes 6 to 10 show the case where the pH is 4.9. A laser was applied for 10, 20, 30, 40 and 50 minutes. FIG. 14 shows the relationship between the laser irradiation time and the band intensity of electrophoresis. The abscissa is the laser irradiation time and the ordinate is the amount of BSA or lysozyme to be detected as a value based on the standard which is the amount of BSA or lysozyme when the laser irradiation time is 10 minutes. The line indicated by the white circle shows the case of BSA when the pH is 11.0, the line indicated by the white square shows the case of BSA when the pH is 4.9, the line indicated by the black circle shows the case of lysozyme when the pH is 11.0 and the line indicated by the black square shows the case of lysozyme when the pH is 4.9.

It is found that as shown in the figure, when the reaction solution is adjusted to pH 11.0, the lysozyme having a closer isoelectric point adsorbs to the surface of the gold microparticles, and therefore lysozyme is selectively decomposed by the high-energy gold microparticles. It is also found that when the reaction solution is adjusted to pH 4.9, the BSA having a closer isoelectric point adsorbs to the surface of the gold microparticles and therefore, BSA is selectively decomposed by the high-energy gold microparticles.

Example 7

Example of Surface-Modified Gold Microparticles

Gold microparticles whose surface was modified by GTR (reducing type glutathione) were produced. 100 mL of a chloro gold acid solution having a concentration of $5 \times 10^{-3}$ M/EtOH and 1 mL of a glutathione solution having a concentration of $5 \times 10^{-1}$ M/EtOH were formulated and mixed vigorously for 5 minutes. 25 mL of a 0.2 M sodium tetrahydroborate solution was added to reduce gold ions to form GTR surface-modified gold microparticles. After that, reprecipitation carried out by centrifugation and washing with water were repeated to remove unreacted GTR and sodium tetrahydroborate. These GTR surface-modified gold microparticles were dispersed in an aqueous solution. If this system is used, GST (glutathione S transferase) can be decomposed with high selectivity by irradiation with, for example, a laser because GST which exists in the solution and has high ability of selectively bonding with GTR strongly is bound strongly with the surface of the gold microparticles. Specifically, 1 μg of GST and 1 μg of BSA were added to 10 μL of an aqueous solution in which 5 mg/mL of the GTR surface-modified gold microparticles were dispersed and 1 μL of a 1 M buffer (Tris) was added to the mixture to adjust the solution to pH 7.0. This solution was centrifuged to precipitate the gold microparticles to collect the supernatant. 50 μg of the precipitated gold microparticles were redispersed by ultrasonic wave in 10 μL of an aqueous solution, to which was added 1 μL of a $5 \times 10^{-1}$ M GTR solution to elute GST bound with the surface of the gold microparticles, thereby collecting the solution. After that, GST and BSA were detected by SDS polyacrylamide gel electrophoresis.

Figure 15:
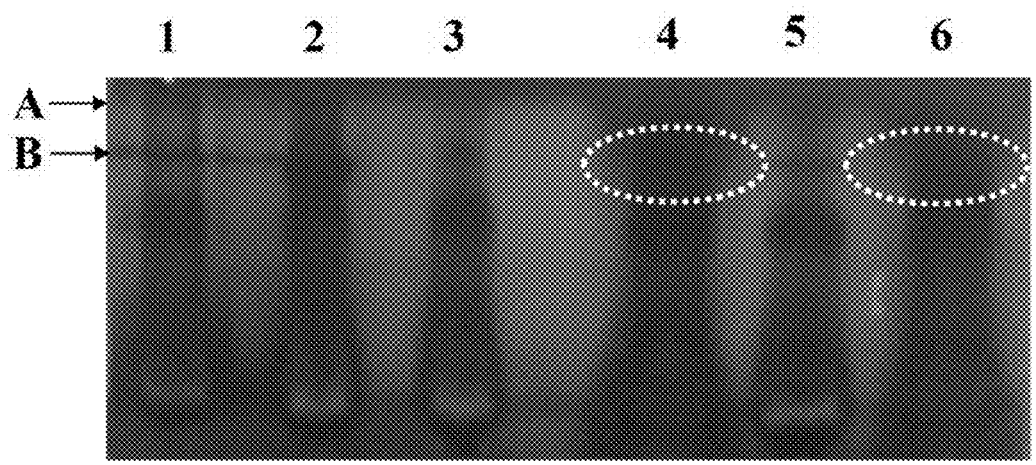
FIG. 15 is a view showing a photograph of electrophoresis after a laser is applied in Example 7 of the present invention; the photograph is a single photograph of a single gel.

A photograph of this electrophoresis is shown in FIG. 15. The SDS gel was dyed by a silver dyeing method. The band of BSA is shown by the arrow A and the band of GST is shown by the arrow B. The lanes 1 and 2 show the band when only BSA or GST was migrated for reference, respectively. The lanes 3 and 4 show the band before and after the dispersion solution is eluted with GTR in the case of adding only GST to the gold microparticles dispersion solution. The lanes 5 and 6 show the band before and after the dispersion solution is eluted with GTR in the case of adding both GST and BSA to the gold microparticles dispersion solution. The band of GST is shown by the dotted black circle for the sake of easy observation. It is found that GST bound with the gold microparticles are eluted by GTR.

The invention claimed is:

1. A method of decomposing a target, wherein the target which is a subject of decomposition is decomposed, the method comprising:

making the target and metal microparticles coexist and putting the metal microparticles into a high-energy state by application of a laser, the making comprising
making the target exist in the vicinity of the surface of the metal microparticles by adjusting a pH of a solution containing the target and the metal microparticles, or by changing an ionic state of the target in the solution or of the metal microparticles in the solution such that the target exists in the vicinity of the metal microparticles while non-target in the solution does not exist in the vicinity of the metal microparticles,
wherein the laser is focused into a region with a volume within a range from approximately 1 μm$^3$ to approximately 1 mm$^3$, and the laser is a pulse laser having a laser intensity in a range from approximately 100 μJ/pulse to approximately 100 mJ/pulse; and
decomposing the target existing in the vicinity of the surface of the metal microparticles by energy transfer from the metal microparticles put into the high-energy state to the target, wherein the target existing in a region no more than approximately 100 nm from the surface of the metal microparticles is decomposed.

2. A method of decomposing a target according to claim 1, wherein a region that is generated in the high-energy state is a micro region.

3. A decomposition apparatus for decomposing a target, wherein the target is a subject of decomposition, the apparatus comprising:
a receiving section used to make the target and metal microparticles coexist;
an energy supply device for putting the metal microparticles into a high-energy state; and
a solution in the receiving section, the solution containing the target and the metal microparticles, wherein:
a pH of the solution containing the target and the metal microparticles is adjusted or an ionic state of the target or of the metal microparticles is adjusted to make the target exist in the vicinity of the surface of the metal microparticles, and
the target existing in a region no more than approximately 100 nm from the surface of the metal microparticles is decomposed by energy transfer from the metal microparticles put into the high-energy state by application of a laser to the target, wherein the laser is focused into a region with a volume within a range from approximately 1 μm$^3$ to approximately 1 mm$^3$, and the laser is a pulse laser having a laser intensity in a range from approximately 100 μJ/pulse to approximately 100 mJ/pulse.

4. A decomposition apparatus for decomposing a target according to claim 3, the apparatus further comprising a dispersing device for dispersing the target and the metal microparticles in the receiving section.

\* \* \* \* \*